US008869268B1

(12) United States Patent
Barger

(10) Patent No.: US 8,869,268 B1
(45) Date of Patent: Oct. 21, 2014

(54) METHOD AND APPARATUS FOR DISRUPTING THE COMMAND AND CONTROL INFRASTRUCTURE OF HOSTILE PROGRAMS

(75) Inventor: Richard Barger, Arlington, VA (US)

(73) Assignee: Symantec Corporation, Mountain View, CA (US)

( * ) Notice: Subject to any disclaimer, the term of this patent is extended or adjusted under 35 U.S.C. 154(b) by 1541 days.

(21) Appl. No.: 11/864,699

(22) Filed: Oct. 24, 2007

(51) Int. Cl.
*G06F 11/00* (2006.01)

(52) U.S. Cl.
USPC .......................................... 726/22; 709/224

(58) Field of Classification Search
USPC ................. 726/14, 22–25; 709/217, 224, 225
See application file for complete search history.

(56) References Cited

U.S. PATENT DOCUMENTS

| | | | | |
|---|---|---|---|---|
| 2006/0212723 | A1* | 9/2006 | Sheymov | 713/194 |
| 2007/0113282 | A1* | 5/2007 | Ross | 726/22 |
| 2007/0128899 | A1* | 6/2007 | Mayer | 439/152 |
| 2007/0204341 | A1* | 8/2007 | Rand et al. | 726/22 |
| 2007/0226797 | A1* | 9/2007 | Thompson et al. | 726/22 |
| 2007/0271610 | A1* | 11/2007 | Grobman | 726/22 |
| 2008/0028463 | A1* | 1/2008 | Dagon et al. | 726/22 |

OTHER PUBLICATIONS

"Current Malware Threats and Mitigation Strategies," US-CERT Informational Whitepaper, produced by Multi-State Information Sharing and Analysis Center and United States Computer Emergency Readiness Team, May 16, 2005.
Rajab, Moheeb Abu et al., "A Multifaceted Approach to Understanding the Botnet Phenomenon," IMC'06, Oct. 25-27, 2006, Rio de Janeiro, Brazil. Copyright 2006.
Dagon, David, "Botnet Detection and Response, The Network is the Infection," OARC Workshop, 2005.
Schonewille, Antoine et al., "The Domain Name Service as an IDS, How DNS can be used for detecting and monitoring badware in a network," a Research Project for the Master System and Network Engineering at the University of Amsterdam, Feb. 5, 2006.

* cited by examiner

*Primary Examiner* — Kambiz Zand
*Assistant Examiner* — Suman Debnath
(74) *Attorney, Agent, or Firm* — Campbell Stephenson LLP

(57) ABSTRACT

A method and apparatus for securing a computer is described. The method and apparatus comprise detecting one or more hostile programs residing upon a computer using a command and control infrastructure library and disrupting a command and control infrastructure of the one or more hostile programs.

24 Claims, 4 Drawing Sheets

METHOD AND APPARATUS FOR DISRUPTING THE COMMAND AND CONTROL INFRASTRUCTURE OF HOSTILE PROGRAMS

BACKGROUND OF THE INVENTION

1. Field of the Invention

Embodiments of the present invention generally relate to computer security. Particularly, embodiments of the present invention relate to a method and apparatus for disrupting the command and control infrastructure of hostile programs.

2. Description of the Related Art

People use computers and computer networks to perform various activities. Unfortunately, computers and computer networks are susceptible to attacks from hackers. Hackers use hostile programs (e.g., malware, botnets, backdoors, Trojans, worms, and the like) to interrupt the performance of such activities and pose significant threats to the stability of a user's computer and security of a user's data.

Hackers employ various deceptive and/or intrusive techniques to store and/or unleash hostile programs on vulnerable computers. Some hostile programs use a computer network to attack and exercise command and control over the infrastructure of numerous computers. For example, botnets are collections of compromised computers under a common command and control infrastructure. The botnet could be established to use the common command and control infrastructure to spread SPAM or viruses throughout a network such as the Internet.

Advanced threats, such as botnets, use statically embedded DNS Fully Qualified Domain Names (FQDN) as well as static Internet Protocol (IP) addresses within malicious programs as a technique to facilitate the command and control of compromised victim computers from remote locations. Recent intelligence indicates that hackers have shifted from employing mobile malware (i.e., malicious software agents that compromise one victim computer and distribute themselves to multiple other vulnerable computers coupled to the victim computer) to focusing their attacks on vulnerable computers. Focused attacks such as email borne attacks allow hackers to exploit the vulnerabilities of specific users rather than the vulnerabilities of specific network assets.

For example, a hacker of ordinary skill in the art of computer programming can develop custom backdoors that utilize reverse shells (i.e., reverse connections) to circumvent a firewall or any other layer of security for an enterprise. In most cases, when a hacker has successfully compromised a vulnerable computer, a hostile binary (e.g., Trojan, worm, rootkit, and the like) is left in the memory as a means for the hacker to control the compromised computer. For the most part, the hostile binary code will make an outbound request utilizing local or remote DNS services to broker a follow on connection (e.g., TCP connection) and/or locate a destination in which to pass UDP (User Datagram Protocol) or ICMP (Internet Control Message Protocol) if the hacker chooses non-standard protocols for surreptitious command and control of the compromised computer.

Hackers are constantly polling live update services (e.g., Antivirus Live Update provided by SYMANTEC Corporation) for up-to-date security programs to ensure that their hostile binary code remains undetected. Once detected, these hackers slightly modify the code just enough so that the modified hostile binary code evades detection and continues to compromise the victim computer. For example, the hacker can map the controlling domain name to another IP address through Dynamic Domain Name System (DNS) services. It is difficult, however, for the hackers to modify and/or reconstitute their infrastructure (i.e., the modified hostile binary code uses the same controlling domain despite the different IP address).

Therefore, there is a need in the art for a method and apparatus for disrupting the command and control infrastructure of hostile programs.

SUMMARY OF THE INVENTION

Embodiments of the present invention comprise a method and apparatus for securing a computer. In one embodiment, the method and apparatus comprise detecting one or more hostile programs residing upon a computer using a command and control infrastructure library and disrupting a command and control infrastructure of the one or more hostile programs.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the word "a" means "at least one", and the word "plurality" means one or more, unless otherwise mentioned.

DETAILED DESCRIPTION

Figure 1:
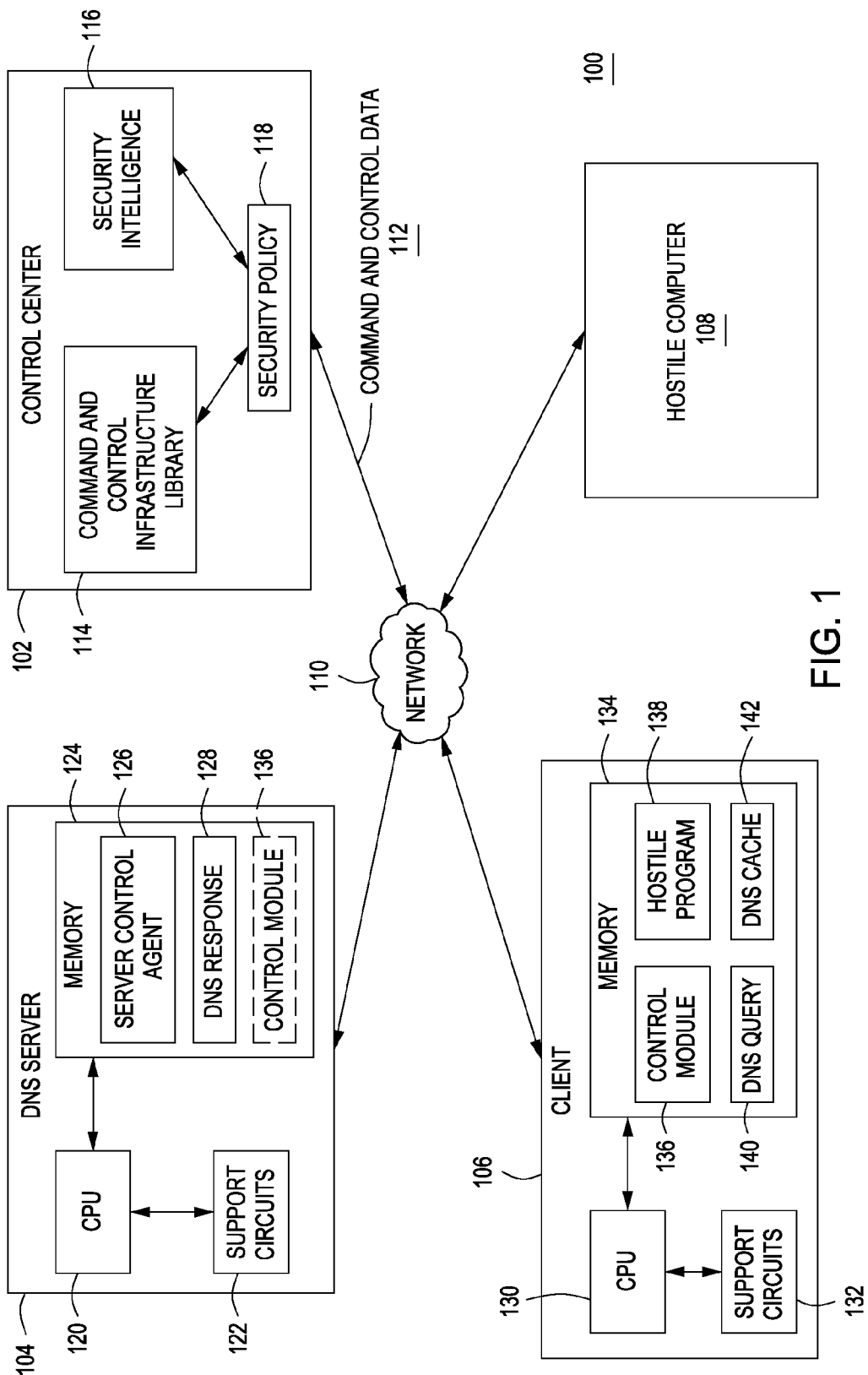
FIG. 1 is a block diagram of an exemplary embodiment of a system in accordance with one or more embodiments of the present invention.

FIG. 1 is an exemplary embodiment of a system 100 in accordance with one or more embodiments of the present invention. The system 100 includes a control center 102, a Domain Name Server (DNS) 104, a client 106 and a hostile computer 108, each coupled through a network 110. It is well understood that although FIG. 1 illustratively refers to one client 106 and one DNS server 104, the present invention may include more than one client 106 and/or DNS server 104.

The control center 102 is responsible for integrating processed security intelligence (e.g., command and control data associated with hostile programs, activity-based and code-based signatures, and the like) into enterprise-wide security policy.

The DNS server 104, generally, is a distributed database that stores mappings between domain names and their Internet Protocol Addresses. The DNS server 104 also provides a list of email exchange servers for each host name. The DNS server 104 resolves IP addresses for domain names upon request from the client 106.

The client 106 is any networked computing device, such as a computer, tablet computers, a Personal Digital Assistant (PDA), a mobile communication device such as a cellular telephone, and the like. In some embodiments, the client 106 forms a portion of a larger enterprise or organization. The client 106 exchanges data with other clients, the control center 102, the DNS server 104 and the hostile computer 108 through the network 110.

The hostile computer 108 is a networked computing device that is used by one or more hostile programs to control a compromised client computer (e.g., the client 106). In most instances, a hostile program (e.g., a Trojan or a rootkit) is left by a hacker once the client 106 is compromised. The hostile computer 108 couples with the hostile program (e.g., using local or remote DNS services) and exerts command and control over the client 106.

The network 110 comprises a communication system that connects a computer system by wire, cable, fiber optic, and/or wireless links facilitated by various types of well-known network elements, such as hubs, switches, routers, and the like. The network 110 may employ various well-known protocols to communicate information amongst the network resources. For example, the network 110 may be part of the Internet or intranet using various communications infrastructure such as Ethernet, WiFi, WiMax, GPRS, and the like.

The control center 102 is coupled to a command and control infrastructure library 114, security intelligence 116 and a security policy 118. In one embodiment, the control center 102 analyzes command and control data 112 from the client 106 and/or the DNS server 104, identifies a hostile command and control infrastructure and creates the command and control infrastructure library 114. Generally, the command and control data 112 comprises information regarding communications from the client 106 (e.g., requests for Domain Name System (DNS) services, requests for mail services, browser activity, port information and the like). In other embodiments, the control center 102 integrates the command and control infrastructure library 114 and the security intelligence 116 into the security policy 118, which is distributed to the client 106 and the DNS server 104.

The security intelligence 116 is developed in order to update a security service coupled to the client 106 with recent code-based and activity-based signatures of hostile programs. For example, the security intelligence 116 includes malicious or hostile Uniform Resource Locators (URLs) and Internet Protocol (IP) addresses extracted from hostile programs (e.g., binary code) and used to generate the code-based and activity-based signatures. The security intelligence 116 may also include "user-defined" hostile command and control infrastructures (e.g., DNS queries and responses) that require disruption in accordance with one or more embodiments of the present invention. The security policy 118 is an enterprise-wide security policy determined by the security intelligence 116 and used to dictate a manner in which DNS services are provided.

The DNS server 104 includes a central processing unit (CPU) 120, various support circuits 122 and a memory 124. The CPU 120 may include one or more microprocessors known in the art. The support circuits 122, which support operation of the CPU 120, may include cache, power supplies, clock circuits, data registers, I/O interfaces, and the like. The memory 124 may comprise random access memory, read only memory, removable memory, flash memory, and various combinations of these types of memory. The memory 124 is sometimes referred to as main memory and may in part be used as cache memory or buffer memory. The memory 124 stores various software packages including a server control agent 126. The memory 124 also stores data including a request for DNS services and a DNS response 128. Optionally, the memory 124 stores a control module 136 as described below.

Similarly, the client 106 also includes a CPU 130, various support circuits 132 and a memory 134. The CPU 130 may include one or more microprocessors known in the art. The support circuits 132, which support operation of the CPU 130, may include cache, power supplies, clock circuits, data registers, I/O interfaces, and the like. The memory 134 may comprise random access memory, read only memory, removable memory, flash memory, and various combinations of these types of memory. The memory 134 is sometimes referred to as main memory and may in part be used as cache memory or buffer memory. The memory 134 stores various software packages including the control module 136 and the hostile program 138. The memory 134 also stores various data including a DNS query 140 and a DNS cache 142.

In operation, the command and control data 112 is sent from the client 106 and/or the DNS server 104 to the control center 102 for analysis. The control center 102 identifies a hostile command and control infrastructure from the analyzed command and control data 112 and creates the command and control infrastructure library 114, which is used by the control module 136 to detect the hostile program 138 at the client 106. For example, the hostile program 138 may use domain names (e.g., Fully Qualified Domain Names (FQDN)) that resolve to the same address (e.g., Internet Protocol (IP) address) as another hostile program whose hostile command and control infrastructure is indexed in the command and control infrastructure library 114. As another example, the hostile program 138 may use the same FQDN as another hostile program whose hostile command and control infrastructure is indexed in the command and control infrastructure library 114.

In one embodiment, the control module 136 compares a domain name within the DNS query 140 to domain names within the command and control infrastructure library 114. In another embodiment, the control module 136 polls the DNS cache 142 for Machine Access Control (MAC) addresses, IP addresses, domain names, and the like. The information stored in the DNS cache 142 is compared with information within the command and control infrastructure library 114.

According to another embodiment, the control module 136 (e.g., within the DNS server 104) compares an IP address within the DNS response 128 to the command and control infrastructure library 114. The DNS response 128, generally, comprises information in response to a received DNS query such an IP address that resolves to a domain name within the received DNS query. In another embodiment, the control module 136 compares the domain name within the received DNS query (e.g., the DNS query 140 sent to the DNS server 104) to information within the command and control infrastructure library 114. In either situation, if a match exists, then there are one or more hostile programs (e.g., the hostile program 138) residing on the client 106.

Once the hostile program 138 is detected in the client 106, the control module 136 disrupts its hostile command and control infrastructure in accordance with one or more embodiments of the present invention. In one embodiment, the control module 136 performs a packet capture function that prevents transmission of the DNS query 140 initiated by the hostile program 138. In another embodiment, the control module 136 (e.g., at the DNS server 104) prevents transmission of the DNS response 128 to the client 106 where the DNS response 128 contains hostile command and control data used for brokering a connection between the hostile program 138 and the hostile computer 108. In yet another embodiment, the control module 136 redirects the DNS response 128 or the DNS query 140 to the control center 102 for investigation and/or further disruption of the hostile command and control infrastructure of the hostile program 138.

Alternatively, the control module 136 detects and disrupts hostile command and control infrastructures by analyzing the behavior of one or more binaries resident in the client 106 or the DNS server 104, in accordance with one or more embodiments of the present invention. The control module 136 is configured to generate a snapshot image of the memory 134 and/or the memory 124. The control module 136 is further configured to compute hash values (e.g., Secure Hash Algorithm (SHA), Message-Digest algorithm (MD5), and the like) for any of a plurality of running processes within the client 106 or the DNS server 104. In either embodiment, if any of the plurality of running processes or data within the memory 134 and/or the memory 124 relate to information regarding hostile command and control infrastructures within the command and control infrastructure library 114, then there are one or more hostile programs (e.g., the hostile program 138) residing on the client 106 or the DNS server 104.

Figure 2:
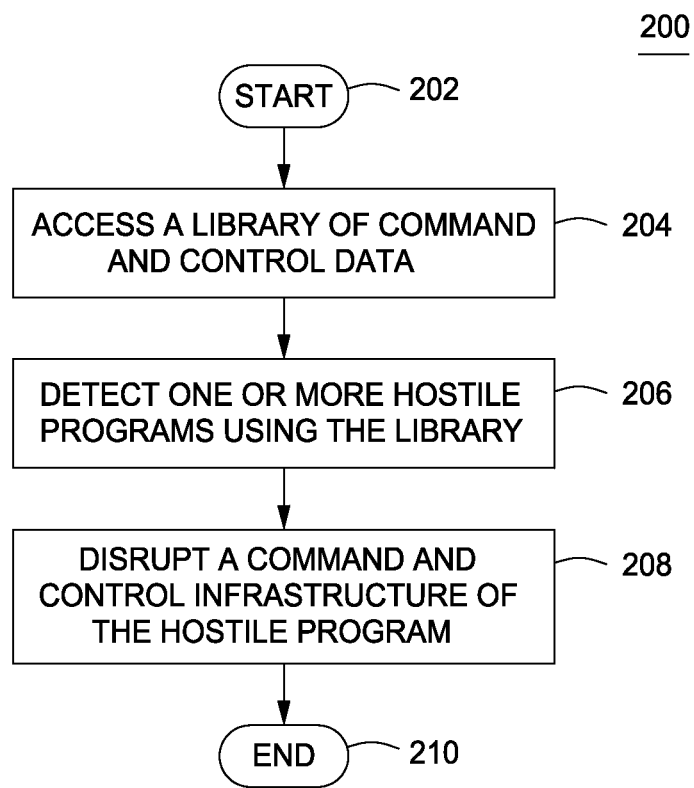
FIG. 2 is a flow diagram of an exemplary embodiment of a method for securing a computer in accordance with one or more embodiments of the present invention.

FIG. 2 is a flow diagram of an exemplary embodiment of a method 200 for securing a client computer in accordance with one or more embodiments of the present invention. The method 200 begins at step 202 and proceeds to step 204. At step 204, a command and control infrastructure library is accessed. As described above for one or more embodiments, command and control data (e.g., the command and control data 112 of FIG. 1) is sent from numerous client computers (e.g., the client 106 of FIG. 1) to a control center (e.g., the control center 102 of FIG. 1) for analysis. One or more hostile command and control infrastructures are identified from the analyzed command and control data and used to create the command and control infrastructure library (e.g., the command and control infrastructure library 114 of FIG. 1).

At step 206, one or more hostile programs are detected using the command and control infrastructure library. As described above, command and control data (e.g., domain names, IP addresses, MAC addresses, and the like) within one or more client computers is compared to information within the command and control infrastructure library. In one embodiment, if a DNS query from one of the client computers comprises a domain name that resolves to an IP address that is also used by another hostile command and control infrastructure that is indexed in the command and control infrastructure library, then one or more hostile programs resides on that client computer. In another embodiment, if a DNS response to a received DNS query generated by a DNS server (e.g., the DNS server 102 of FIG. 1) comprises an IP address that is used by another hostile command and control infrastructure, then that client computer also has one or more hostile programs.

At step 208, a command and control infrastructure associated with the one or more hostile programs is disrupted. In one embodiment, a control module at the DNS server prevents transmission of the DNS response to the DNS query from the compromised client computer, as described herein. In another embodiment, a control module at the compromised client computer prevents transmission of the DNS query to the DNS server.

Alternatively, the control module at the DNS server redirects the DNS response to a control center for investigation. The control center is now on alert for command and control data related to the command and control infrastructure associated with the detected hostile programs. Similarly, the control module at the compromised client computer redirects the DNS query to the control center for investigation and alerts a user of the compromised computer of the resident hostile programs. Optionally, the control module at either the DNS server or the compromised client computer logs DNS queries and DNS responses, respectively, that are related to the command and control infrastructure associated with the detected hostile programs. At step 210, the method 200 ends.

Figure 3:
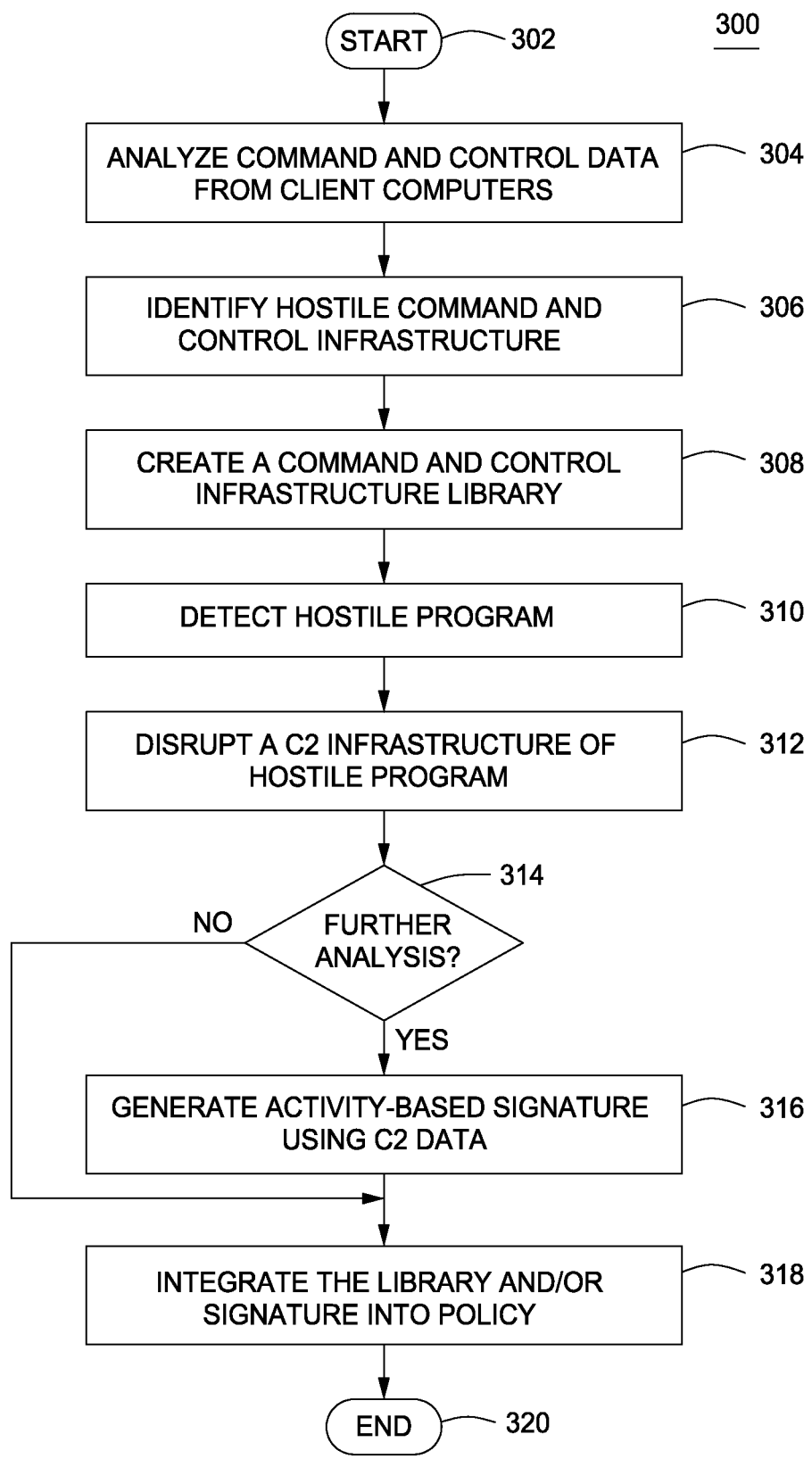
FIG. 3 is a flow diagram of an exemplary embodiment of a method for creating a command and control infrastructure library in accordance with one or more embodiments of the present invention.

FIG. 3 is a flow diagram of an exemplary embodiment of a method 300 for integrating a command and control infrastructure library into enterprise wide security policy (e.g., the security policy 118 of FIG. 1) in accordance with one or more embodiments of the present invention.

The method 300 begins at step 302 and proceeds to step 304. At step 304, command and control data gathered from one or more client computers is analyzed. At step 306, a hostile command and control infrastructure is identified from the command and control data, as shown above. At step 308, a command and control infrastructure library is created. At step 310, a hostile program is detected (e.g., at the client 106), as described above. At step 312, a hostile command and control infrastructure associated with the hostile program is disrupted. In one embodiment, information regarding the hostile command and control infrastructure is added to the command and control infrastructure library.

At step 314, a determination is made as to whether further analysis is needed for securing one or more computers (e.g., the client 106). At step 316, an activity-based signature is generated using the hostile command and control infrastructure associated with the hostile program. At step 318, the command and control infrastructure library and/or the activity based signature is integrated into an enterprise-wide security policy that is distributed downstream to one or more control modules (e.g., the control module 136 at the client 106 and/or the DNS server 102) and/or one or more server control agents (e.g., the server control agent 126). At step 320, the method 300 ends.

Figure 4:
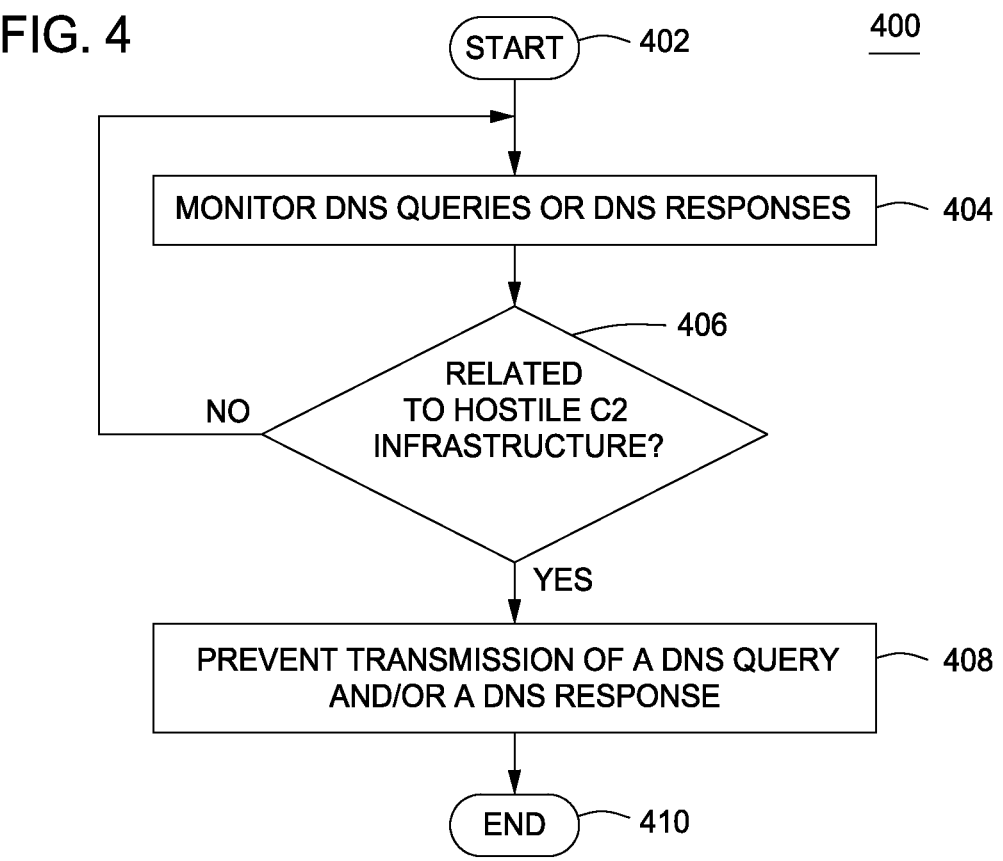
FIG. 4 is a flow diagram of an exemplary embodiment of a method for disrupting a command and control infrastructure used by a hostile program in accordance with one or more embodiments of the present invention.

FIG. 4 is a flow diagram of an exemplary embodiment of a method 400 for disrupting a hostile command and control infrastructure in accordance with one or more embodiments of the present invention. The method 400 depicts one or more embodiments of the step 208 of the method 200, as described above.

The method 400 begins at step 402 and proceeds to step 404. At step 404, one or more requests for DNS services (e.g., the DNS query 140) and/or responses to requests for DNS services (e.g., the DNS response 128) between one or more client computers and a DNS server are monitored. Such monitoring may be performed at the client 106 and/or the DNS server 102 (e.g., using the control module 136, as described above).

At step 406, a determination is made as to whether any of the requests and/or any of the responses to the requests is related to the hostile command and control infrastructure associated with a hostile program. In one embodiment, the DNS query 140 and/or the DNS response 128 is compared with the hostile command and control infrastructure. In another embodiment, any DNS query initiated by the hostile program is related to the hostile command and control infrastructure. If the hostile command and control infrastructure is not related to any of the requests or any of the responses to the requests, the method 400 returns to step 404. If a hostile command and control infrastructure is related to any of the requests and/or any of the responses to the requests, the method 400 proceeds to step 408.

At step 408, transmission of the related requests (e.g., the DNS query 140) and/or responses to the related requests (e.g., the DNS response 128) is prevented. In one embodiment, a control module (e.g., the control module 136) at the DNS server prevents transmission of the DNS response 128 to the compromised client computer. In another embodiment, a control module at the compromised client computer prevents transmission of the DNS query to the DNS server. In yet another embodiment, once the hostile program in the client computer is detected, transmission of any DNS query initiated by the hostile program is disrupted. As a result, the hostile program at the compromised client computer cannot broker a connection (e.g., a TCP connection) or locate a destination (e.g., the hostile computer 108) in which to pass UDP or ICMP to facilitate control over the compromised client computer. At step 410, the method 400 ends.

While the foregoing is directed to embodiments of the present invention, other and further embodiments of the invention may be devised without departing from the basic scope thereof, and the scope thereof is determined by the claims that follow.

The invention claimed is:

1. A method for securing a computer, comprising:
 transmitting, by the computer, suspect command and control data to a control center, wherein
  the suspect command and control data includes a reference to a domain name server (DNS) service, and
  the control center is configured to
   analyze the suspect command and control data, and
   update a command and control infrastructure library, if the suspect command and control data is identified as hostile;
 detecting by the computer, a hostile program stored on the computer, wherein
  the hostile program is identified by detecting that the reference to the DNS service in the suspect command and control data matches information in the command and control infrastructure library,
  the detecting the reference to the DNS service in the suspect command and control data is performed prior to the suspect command and control data being submitted to a DNS server,
  the hostile program is configured to be controlled by a hostile command and control infrastructure, and
  the hostile command and control infrastructure is associated with a hostile computer; and
 disrupting by the computer, the hostile command and control infrastructure, wherein
  the disrupting comprises impairing communication with the hostile program.

2. The method of claim 1, further comprising:
 creating the command and control infrastructure library, if the suspect command and control data is identified as hostile.

3. The method of claim 2, wherein the creating comprises identifying at least one of
 a domain name,
 an internet protocol address, or
 a machine access code address that forms the portion of a hostile command and control infrastructure.

4. The method of claim 2, wherein the disrupting further comprises disrupting a connection between the hostile program and the hostile computer.

5. The method of claim 4, wherein the disrupting, by the computer, further comprises disrupting a request for the DNS service related to a domain name within the command and control infrastructure library.

6. The method of claim 5, wherein the disrupting, by the computer, further comprises polling cached information for the request for the DNS service related to the domain name within the command and control infrastructure library.

7. The method of claim 5, wherein the disrupting, by the computer, further comprises rejecting the request for the DNS service related to the domain name within the command and control infrastructure library.

8. The method of claim 5, wherein
 the disrupting, by the computer, further comprising establishing a plurality of unacceptable domain names,
 the plurality of unacceptable domain names comprises
  at least one domain name within the command and control infrastructure library, and
  comparing the request for the DNS service to the plurality of unacceptable domain names.

9. The method of claim 5, wherein the disrupting, by the computer, further comprises
 monitoring at least one DNS query; and
 detecting that the DNS query is related to a domain within the command and control infrastructure library.

10. The method of claim 9, wherein the disrupting, by the computer, further comprises preventing transmission of the DNS query from the computer to the DNS server.

11. The method of claim 9, wherein the disrupting, by the computer, further comprises preventing transmission of a response to the DNS query from the DNS server to the computer.

12. The method of claim 1, further comprising creating an activity-based signature for the hostile program.

13. An apparatus comprising:
 a non-transitory computer-readable memory; and
 a processor coupled to the non-transitory computer-readable memory, wherein
  the processor is configured to
   transmit suspect command and control data to a control center, wherein
    the suspect command and control data includes a reference to a domain name server (DNS) service, and
    the control center is configured to
     analyze the suspect command and control data, and
     update a command and control infrastructure library, if the suspect command and control data is identified as hostile;
   detect a hostile program stored on the non-transitory computer-readable memory, wherein
    the hostile program is identified by detecting that the reference to the DNS service in the suspect command and control data matches information in the command and control infrastructure library,
the processor is configured to perform the detecting the reference to the DNS service in the suspect command and control data prior to the command and control data being submitted to a DNS server,
the hostile program is configured to be controlled by a hostile command and control infrastructure, and
the hostile command and control infrastructure is associated with a hostile computer; and
disrupt the hostile command and control infrastructure, wherein
the disrupting the hostile command and control infrastructure comprises impairing communication with the hostile program.

14. The apparatus of claim 13, wherein the disrupting, by the computer, further comprises disrupting a query for the DNS service related to a domain name within the hostile command and control infrastructure.

15. The apparatus of claim 13, wherein the processor is further configured to produce at least one of a snapshot of a memory of a computer or a hash value for each process in operation within the computer.

16. A non-transitory computer-readable storage medium storing instructions executable by a processor, wherein the instructions, when executed, perform a method comprising:
transmitting suspect command and control data to a control center, wherein
the suspect command and control data includes a reference to a domain name server (DNS) service, and
the control center is configured to
analyze the suspect command and control data, and
update a command and control infrastructure library, if the suspect command and control data is identified as hostile;
detecting a hostile program stored on the non-transitory computer-readable storage medium, wherein
the hostile program is identified by detecting that the reference to the DNS service in the suspect command and control data matches information in the command and control infrastructure library,
the detecting the reference to the DNS service in the suspect command and control data is performed prior to the suspect command and control data being submitted to a DNS server,
the hostile program is configured to be controlled by a hostile command and control infrastructure, and
the hostile command and control infrastructure is associated with a hostile computer;
disrupting the hostile command and control infrastructure, wherein
the disrupting comprises impairing communication with the hostile program.

17. The non-transitory computer-readable storage medium of claim 16, wherein the control center generates an activity-based signature for the hostile command and control infrastructure of the hostile program and integrates the activity-based signature into a security policy.

18. The non-transitory computer-readable storage medium of claim 16, further comprising:
monitoring a DNS query from the DNS server,
detecting that the DNS query is related to a domain within the hostile command and control infrastructure, and
preventing transmission of a response to the DNS query from the DNS server.

19. The non-transitory computer-readable storage medium of claim 16, further comprising:
monitoring a DNS query from a DNS client,
detecting that the DNS query is related to a domain within the command and control infrastructure library, and
preventing transmission of the DNS query to the DNS server.

20. The non-transitory computer-readable storage medium of claim 16, further comprising:
polling cached information for at least one DNS query related to a domain name within the hostile command and control infrastructure library.

21. The method of claim 1, wherein
the suspect control and command data comprises a DNS query,
the detecting, by the computer, further comprises
the computer detecting that the reference to the DNS service in the DNS query matches the information in the command and control infrastructure library, and
the computer detecting the reference to the DNS service in the DNS query is performed prior to the DNS query being submitted to the DNS server.

22. The method of claim 21, wherein
the suspect control and command data further comprises data of a DNS cache, and
the detecting, by the computer, further comprises
the computer detecting that the reference to the DNS service in the data of the DNS cache matches the information in the command and control infrastructure library.

23. The method of claim 1, wherein
the reference to the DNS service indicates the DNS service is being performed using the DNS server.

24. The method of claim 1, wherein
the hostile computer and the computer are separate computers, and
the hostile computer and the computer are communicatively coupled together via a network.

* * * * *